United States Patent Office 2,955,059
Patented Oct. 4, 1960

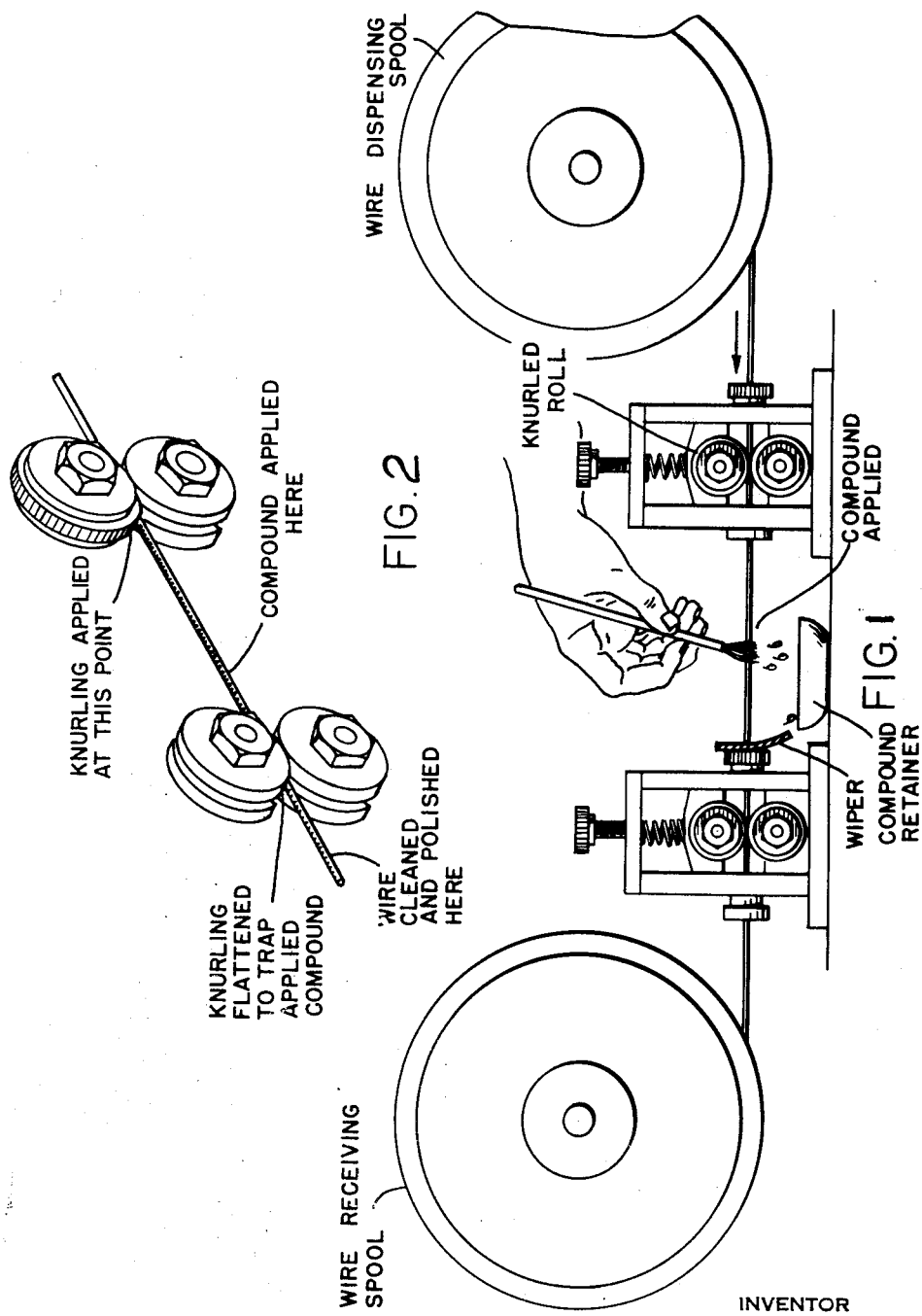

2,955,059

ELECTRIC ARC ELECTRODE

Albert Muller, Watchung, N.J., assignor to Air Reduction Company Incorporated, New York, N.Y., a corporation of New York Original application May 17, 1952, Ser. No. 288,447, now Patent No. 2,694,763, dated Nov. 16, 1954. Divided and this application Sept. 16, 1954, Ser. No. 456,448

The terminal portion of the term of the patent subsequent to Nov. 16, 1971, has been disclaimed 2 Claims. (Cl. 117—202)

This invention relates to gas shielded electric arc welding and more particularly to electrodes for use in inert gas shielded arc welding with a consumable or depositing electrode, referred to herein as inert gas shielded metal arc welding.

This application is a division of my co-pending application Serial No. 288,447, filed May 17, 1952, now Patent 2,694,763, which is in some respects a division and in other respects a continuation-in-part of my co-pending application Serial No. 204,726 filed January 6, 1951, which in turn is a continuation-in-part of my prior application Serial No. 76,443, filed February 15, 1949. The inventive subject matter hereof can be considered in at least certain aspects to constitute a new and useful improvement in electrodes for gas shielded metal arc welding of the type disclosed in Muller et al. Patent No. 2,504,868, issued April 18, 1950; Miksalapov Patent No. 2,544,711, issued March 13, 1951; and Muller et al. Patent No. 2,544,801, issued March 13, 1951; all assigned to the assignee of the present application.

In general, this invention involves the addition to an inert gas shielded consumable electrode welding arc of a substance or substances which act to alter, in a desired predetermined manner and to a desired predetermined extent, the heat balance between the welding electrodes, i.e., the quantity of heat released or produced at the cathode during the welding operation relative to the heat released or produced at the anode during the welding operation. Thus the heat balance of the inert gas shielded metal arc welding process can be controlled. Further and/or other features hereof involve the addition to such a welding arc of a substance or substances which act to improve the characteristics of the metal transfer from the consumable electrode to the workpiece; to improve the stability of the arc, and to control or alter in a desired manner those factors of the welding arc which determine the speed, efficiency and facility of the welding operation and the characteristics of the resulting weld.

Patents Nos. 2,504,868; 2,544,711; and 2,544,801 referred to above, disclose a welding operation of the type in which a consumable electrode wire is fed continuously to a gas shielded welding arc maintained between the electrode and a workpiece (plate), the welding current supplied to the arc being at least sufficient to consume the electrode as it is fed to the arc and transfer weld metal from the electrode to a weld deposit on the workpiece to form a commercially satisfactory weld, the current preferably being also supplied at a high current density sufficient to provide a smooth, fast and uniform deposit or "spray type" transfer (see Patent No. 2,504,868) of said electrode metal to the weld deposit. The shielding gas consists essentially of an inert gas. Inert shielding gas as used herein refers to the monatomic gases or mixtures thereof such as helium and/or argon and may include minor proportions of other gases that do not substantially alter the shielding characteristics of said monatomic inert gas or gases, preferably supplied as a substantially non-turbulent or laminar flow stream of sufficient "flow stiffness" to exclude substantially all the ambient atmosphere from the arc. Such an arc involves an electrical discharge through a controlled gas atmosphere. The gas in the arc gap is ionized and the resulting positive gas ions are impelled by the potential gradient toward the cathode where they yield their energy to the cathode or are neutralized by electrons emitted from the cathode. Metal vapor formed in the arc region by vaporization of the electrode, the plate (workpiece) or any other source such as a separate filler wire, forms part of the gas in the arc gap, so that the arc atmosphere through which the electrical discharge takes place and through which the weld metal transfers from the wire electrode to the plate comprises the inert shielding gas and said metal vapor, substantially all air, water vapor and other constituents of the ambient atmosphere being excluded by the inert gas shield. Since there is no flux, atmospheric air or similar impurity present as would be the case in welding in air, under a flux blanket, or with coated electrodes, the characteristics of such an arc, at a constant pressure, depend solely upon the characteristics of the plate and electrode metals and of the inert shielding gas.

According to the present invention, it has been discovered that by providing certain addition substances in said arc (in addition to the metal which is melted to form the weld bead and the metal vapors thereof, and in addition to the inert shielding gas) the heat balance and/or certain other characteristics of the welding arc can be controlled or changed in a desirable manner. These addition substances are so selected and so added to the arc as to lower the work function of the cathode to shift the heat balance (the heat generated or released at the cathode relative to the heat generated or released at the anode) in a predetermined manner and to a predetermined extent, and to provide a stable, concentrated cathode spot. It is believed that where the wire is the cathode concentration of the cathode spot in this manner improves metal transfer so long as the drops or spray of molten metal as it leaves the wire is completely immersed in the plasma. Thus, the addition materials of the present invention may act to stabilize the arc and improve the metal transfer characteristics of the arc (for example, promote the spray type transfer from the wire to the work), also they may alter in a predetermined manner such factors as wire burn off rate, penetration, and size and contour of the weld bead.

It is believed that the heat liberated or generated at the cathode in inert gas shielded metal arc welding is to a large extent the result of the positive ion bombardment thereof. When the cathode is of such nature that it emits electrons thermionically in relatively large quantities at its welding temperature, it is believed that the positive ions are neutralized to a large degree before they reach the cathode, the cathode voltage drop is low, and bombardment of the cathode and generation of heat at the cathode is minimized. When the cathode is a poor thermionic electron emitter at its welding temperature, the positive ion bombardment is heavier, the cathode voltage drop is high, and relatively large quantities of heat are generated at the cathode.

It has been found that when a material which is a good thermionic electron emitter at its welding temperature (i.e., a thermionic material) is used as a welding arc cathode it forms a very efficient cathode with a low cathode voltage drop and a low heat release. This may be attributed to the fact that positive ion bombardment which is thought to produce a major portion of the total heat liberated to the cathode is relatively light, or limited, in the case of thermionic materials; such materials emit at their welding temperature, with a low cathode voltage drop, all the electrons needed by the arc. This limiting effect is not present in the case of the relatively poor thermionic emitters or "cold cathode" materials, in which class fall most of the common structural materials such as aluminum, copper, nickel, iron, magnesium, titanium, etc., and alloys thereof normally welded commercially in large quantities. From a highly simplified viewpoint, if cold cathode material is used as the cathode of the arc it forms an inefficient cathode and as a result, there is in the inert gas shielded welding arc having electrodes of cold cathode material a heavy positive ion bombardment of the cathode and a high heat release at the cathode, as compared with cathodes of thermionic material which are relatively efficient, resulting in a low heat release.

There is little difference in the heat release to the welding arc anode, whether it be composed of a thermionic or a cold cathode material. It has been found that the anode heat release is intermediate between the high heat release to a cold cathode material used as a cathode and a thermionic material used as a cathode.

There is another important difference between the operation of a thermionic cathode as compared to a cold cathode in inert gas shielded metal arc welding. Since the thermionic cathode emits electrons readily and copiously by virtue of its temperature, it continues to emit these electrons even after the current to the arc is extinguished due to the thermal lag in the temperature of the electrode. Since electron emission by cold cathode material does not depend upon thermal effect, the supply of electrons is immediately extinguished when the current is interrupted. It has been found that thermionic materials form more stable inert gas shielded consumable electrode welding arcs, particularly when A.C. is used for the power supply. When arc interruptions occur a supply of electrons continues to be given off from the thermionic cathode by virtue of its temperature to produce easy re-ignition of the arc at a low open circuit voltage. The cold cathode material requires a very high open circuit voltage, sufficient to establish a glow discharge, before re-striking the arc after an arc interruption.

The present invention provides for the modification of welding electrode materials, and particularly cold cathode welding electrode materials, in inert gas shielded metal arc welding to produce electrical and thermal arc characteristics that are similar to and/or which approach to a predetermined degree the electrical and thermal arc characteristics of thermionic welding electrode materials, at the temperatures occurring in the inert gas shielded consumable electrode welding arc. The electrical and thermal characteristics of an inert gas shielded metal welding arc between electrodes formed of cold cathode materials are thus controlled, such control being accomplished preferably through the addition of material to the arc which acts to change the heat produced or released at the cathode relative to that produced or released at the anode, i.e., to shift the heat balance of the arc. It has been found that such additions may be made in minute amounts relative to the amount of deposited weld metal, or electrode wire consumed. The material added may be in such small amounts as to affect only the electrical and thermal characteristics of the arc. While it will change beneficially or control the size and shape of the weld bead it can, if desired, be so selected, and used in such small quantities, as to have no substantial or appreciable effect on the chemical composition of the weld metal, or appreciable reaction with the metal being welded.

Welding arcs to which additions are made according to this invention are preferably those having a substantially "sterile" arc atmosphere or environment consisting essentially of inert shielding gas and such metal or like vapor as boils off the electrode, and workpiece. The non-turbulent inert shielding gas stream substantially excludes the ambient atmosphere from such welding arc and, because the welding process is a fluxless one, the electrical and thermal characteristics of such arcs depend solely upon those of the shielding gas and the metal of the electrodes. Fluxless, sterile, consumable bare electrode welding arcs of this character have different electrical and thermal properties than welding arcs in air, welding arcs formed under a submerged flux blanket, or those formed with the conventional flux coated electrodes. It has been found, according to the present invention, that the electrical and thermal characteristics of such inert gas shielded consumable electrode welding arcs can deliberately be varied and controlled to provide new and improved types of welding. The relatively pure, sterile inert gas environment insures that the added control substances will act upon or with, or will modify the arc electrode surfaces and/or the arc atmosphere in the manner and to the extent desired without loss of the beneficial effect of the inert shielding gas and without either loss of control or undesired further modification of electrical and thermal properties that might result from the presence of impurities such as air or fluxes and coatings which are present in conventional welding in air, under a flux blanket, and with coated electrodes.

One of the objects of the invention is to provide a commercially practicable means for shifting the heat balance of the inert gas shielded consumable electrode direct current welding arc to a selected degree. Direct current welding arcs are, of course, of two types, the straight polarity direct current welding arc in which the wire electrode is the arc cathode and the reverse polarity direct current welding arc in which the plate or work is the arc cathode.

Another object is to provide means for improving the metal transfer characteristics and the stability of the inert gas shielded consumable electrode direct current welding arc and the inert gas shielded consumable electrode alternating current welding arc.

Other objects are to obtain better arc stability in inert gas shielded metal arc welding, particularly where inert shielding gases of relatively poor ionization properties, such as helium, are used; and to provide means for varying or controlling such factors of the inert gas shielded consumable electrode welding arc as weld bead size, shape and penetration, rate of weld metal deposition from the consumable electrode to the plate (burn off rate), amount of plate metal melted per unit of time, size and shape of the weld crater and the weld puddle on the plate, and similar factors having to do with the speed, facility of operation and results of the inert gas shielded metal arc welding process.

Still other objects, results and advantages of the invention will be understood by and apparent to those skilled in the art upon considering the following detailed description and explanation of certain presently preferred embodiments of the invention and from the accompanying drawings in which:

Fig. 1 illustrates schematically a method and apparatus for making additions to a welding electrode wire for the purpose of the present invention.

Fig. 2 illustrates, on a somewhat enlarged scale, the welding wire as it appears during the various steps of preparation illustrated in Fig. 1.

As previously stated, the invention can be utilized for the purpose of controlling the amount of heat liberated at one terminal of an inert gas shielded consuming electrode welding arc relative to the heat liberated at the other terminal of the same welding arc. In inert gas shielded metal arc welding of the common structural metals or cold cathode metals, when the work is made the cathode of a direct current arc and the consuming electrode wire is made the anode (i.e., reverse polarity), considerably more heat is liberated at the work than in the wire. By providing certain materials in the arc in very small amounts and in the manner to be hereinafter more fully described, all other conditions being the same, this invention enables the heat balance to be shifted in reverse polarity operations by any desired amount to the other extreme condition where the heat in the wire greatly exceeds the heat in the work. Similarly in inert gas shielded metal arc welding of the common structural metals where the wire electrode is made the cathode and the work is made the anode (i.e., straight polarity) considerably more heat is liberated in the wire than is liberated in the work—this to the extent of making the process in many instances practically inoperable. By providing certain materials in the arc in amounts and in the manner to be hereinafter more fully described, all other conditions being the same, this invention enables the heat balance to be shifted by any desired amount to make the process operable by reducing the heat in the wire relative to the heat in the work. By the proper selection and application of materials, a heat balance can be provided in the straight polarity inert gas shielded metal arc welding process with heat balance control additions that approximates the heat balance provided by the reverse polarity process with no additions present; straight polarity inert gas shielded metal arc welding can thus be made a commercially satisfactory process.

*Example I*

For example, aluminum can be welded with straight polarity according to the invention by making a cesium nitrate addition to the aluminum electrode wire, as shown by the following. A weld was made on an aluminum alloy plate with an aluminum alloy electrode, using welding grade argon (99.5% pure) as a shield gas delivered as a non-turbulent flow stream at 75 cubic feet per hour through a 1 inch diameter nozzle. The apparatus was substantially the same as that disclosed in the aforementioned Mueller et al. Patent Number 2,504,868. The electrode wire was a 1/16 inch diameter 43 S aluminum wire having applied thereto a small amount of cesium nitrate. The plate on which the weld bead was deposited was 61 ST aluminum 3/8 inch thick. The weld travel speed was 10 inches per minute. The cesium nitrate was applied to the wire (Figs. 1 and 2). The wire was first prepared by passing it through a pair of rolls, one of which was knurled, to form transverse impressions (about .005 inch deep and spaced apart by about 1/32 inch) on its surface (Fig. 5). The cesium nitrate, in the form of a dry powder, was made into a slurry or paste by mixing it thoroughly with a quantity of denatured alcohol. This slurry or paste was then applied to the wire by brushing it onto the surface (Fig. 1) and into the transverse impressions on the wire surface. Following this step the wire was passed through a tightly-fitting annular rubber squeegee to remove the excess slurry. Next the wire was passed through a pair of smooth surfaced semi-circularly grooved rolls to smooth the surface roughness caused by the knurled roll and trap some of the addition material in the impressions. The surface of the wire was then wiped with a clean dry cloth to remove substantially all the cesium nitrate except that which was trapped or impressed by the above treatment into the electrode surface. The alcohol evaporated leaving the wire dry. When prepared in the manner described, the wire has a substantially bare, electrically conductive surface and it can be readily fed through the welding apparatus; its ability to pick up the welding current from the contact tube is unimpaired. Under the aforesaid conditions and with an arc current of 220 amperes, straight polarity, the wire burn off rate (wire feed speed) was 160 inches per minute and the arc voltage 16 volts. The weld operating conditions were excellent with spray transfer from the metal from the electrode to the work, a quiet arc, and no spatter. Arc regulation was good (arc length and voltage remained substantially constant). The weld bead was well rounded and smooth.

To illustrate the effect in heat balance shift produced by this addition of cesium nitrate to the aluminum electrode wire a comparable straight polarity weld was attempted with an untreated aluminum electrode. The same apparatus and identical welding conditions were used with the exception that an untreated aluminum electrode was substituted for the cesium nitrate treated electrode. The resulting process was inoperable. The burn off rate was excessive, being well over 500 inches per minute. There was very poor arc regulation, the arc was wild and spatter profuse. The weld bead was irregular and not well fused into the plate but rather overlapped the plate and lacked adequate penetration. The arc voltage was considerably higher than that with the cesium nitrate treated wire, but because of the poor arc length regulation it was impossible to obtain a reliable arc voltage reading. The significant and conclusive difference between the process with the cesium nitrate treated wire and the untreated wire is that in the first the wire burn off rate was 160 inches per minute whereas in the second it was in excess of 500 inches per minute, indicating a vast difference in the amount of heat liberated in the wire as a cathode. In addition, transfer of metal in the first case was good and the process a commercially operable process, whereas in the second, transfer was poor and the process inoperable for practical purposes.

*Example II*

The following is a further example of the application of the invention to non-ferrous metals. Welds were made on a steel plate using an aluminum bronze alloy wire electrode, both with the wire treated with cesium rubidium chloride and with an untreated wire. The particular wire employed was an alloy comprising approximately 9% aluminum and the balance copper. The wire was 1/16 inch in diameter, and the plate on which the weld bead was made was 3/8 inch thick mild steel. The welding apparatus and the gas shield were identical to those heretofore described. Cesium rubidium chloride was applied to the electrode wire in exactly the same manner as the rubidium carbonate in the first example in this specification. With the electrode wire connected as the cathode (straight polarity), and a welding current of 225 amperes, the treated wire burn off rate was 210 inches per minute at an arc voltage of 18 volts. Metal transfer across the arc was good, being in the form of a fast drop transfer. The bead was quite well faired into the plate and had an oval profile. Arc length regulation was good. When identical conditions were maintained, but an untreated wire employed, the burn off rate was 320 inches per minute at an arc voltage of 20 volts. The metal transferred across the arc in larger drops, the bead formed was irregular, and there was poor regulation of the arc. The deposited metal built up on the plate and did not fuse in well. The process was inoperable from a practical point of view. Again, it may be seen that considerably more heat was liberated in the wire as a cathode when the wire was untreated, as compared with the heat liberated in the wire having small quantities of cesium rubidium chloride associated therewith.

While heat balance shift is probably easiest to statistically describe in connection with the straight polarity arc because of the extreme differences in wire burn off rate, it is also present in the reverse polarity arc. As stated above, heat liberated at the anode of the welding arc is practically independent of the emissivity of the anode material, therefore the wire burn off rate should be substantially constant with reverse polarity (wire the anode) whether or not the additions of the present invention are made to the arc. This has been found to be true.

*Example III*

Another example, using reverse polarity, with a non-ferrous material, is a weld made with a 1/16 inch diameter aluminum electrode wire, utilizing the same welding apparatus hereinbefore described. The gas shield was welding grade argon delivered at 75 cubic feet per hour in a non-turbulent flow through a 1 inch diameter nozzle. A 3/8 inch thick aluminum plate was the cathode. When the wire was first treated by applying a small amount of cesium nitrate in the manner previously described the wire burn off rate was 165 inches per minute at 205 amperes and 19 volts. The resulting weld was good. When an untreated aluminum wire was used under the same circumstances the wire burn off rate was 175 inches per minute at 22 volts. The weld bead was somewhat flatter and the arc characteristics and metal transfer were good.

It is significant to note that when the wire is the anode the addition material has little or no effect on the wire burn off rate but the arc voltage is reduced by a substantial amount and the total arc power is considerably less. Since the wire burn off rate is substantially constant, it is evident that the heat in the work must be reduced. This is exactly what would be expected according to the invention if the work were made a better thermionic emitter. Therefore, it is clear that in these reverse polarity examples the addition made to the wire transferred to the weld pool with the depositing weld metal and increased the thermionic emission of the weld pool as a cathode. Thus, when additions are made to the wire according to the invention the heat liberated in the wire is substantially reduced where the wire is the cathode and the work the anode, and the heat liberated in the work can also be substantially reduced where the wire is the anode and the work the cathode.

It has been found that very small amounts of the addition materials are required to effect the desired results. It is clear from the preceding description of a method of application of the material to the wire which has been found satisfactory, that very little of the addition material remains on the wire in its finished, treated state. As a matter of fact, difficulty may be encountered in feeding the wire through the contact tube and transferring current to it if the added material is on the surface of the wire in sufficient quantity to rub off. The treated wire can still be considered as a "bare" wire, and its surface is electrically conductive for pick-up of the welding current as it is fed through the contact tube.

The addition materials of the present invention are materials that break down (if a compound) into a metallic emission agent or element, of low work function and low ionization potential, which is electropositive with respect to the cathode base metal and which provides a thin film over all or part of the electrode (cathode) surface during the welding operation. The coating of an electro-positive metal on a more electro-negative one produces a marked lowering of the work function of the composite surface, resulting in effect in increased thermionic emission at welding electrode temperature. The process is believed to proceed as follows. The compound containing the emission agent or element (assuming the emission agent is added to the arc in the form of a compound) is reduced or dissociated and frees the emission agent as a metal in or on the molten portion of the welding cathode. The emission element diffuses to the molten cathode surface and/or migrates over said surface to form a composite, highly thermionically emissive, welding cathode surface. It appears that the fully activated surface corresponds to a monatomic layer of atoms or ions of the emission agent which covers a large part, for example more than 50% of the cathode surface. This thin layer of the emission element is held on the surface with attractive forces so strong that substantial evaporation does not begin until temperatures are reached that are well above the boiling point of the emission element, though excess quantities of the element may evaporate at low temperatures to leave said thin layer or patches of the element on the cathode surface. It should be noted that the temperatures of the welding arc, usually operated at atmospheric pressures, are above the dissociation points of most compounds. The monatomic layer or patches of atoms of the emission element is believed absorbed as ions on the base metal cathode surface and the forces which tend to hold it in place should be highest when the ionization potential of the emission element is low, it would appear that the ionization potential of the emission element should be less than the work function of the cathode base metal but in practice, possibly because work functions are difficult to determine accurately, it has been found that the ionization potential of the emission metal may sometimes be as high as one and one-half electron volts greater than the values given by reliable investigators for cathode base metal work functions. In general, the emission element must be electropositive with respect to the base metal; the work function of the composite surface is lowest and its thermionic emissivity is highest when this difference is at its largest positive value and the work function becomes higher and thermionic emissivity lower as the difference reaches zero and becomes negative.

As an alternative to the preparation method of Fig. 1, in which the material is applied to the surface of the wire or embedded in surface indentations therein, the addition material may be added to the melt when the wire is being manufactured, to form an alloy or mixture therewith. This provides homogeneous distribution of the addition material through the wire and eliminates the need for separate processing of the wire subsequent to its manufacture in wire form.

Beside the above-described modes of introducing the addition material to the arc for the purposes herein described, it has been found that under certain conditions the addition material can be put on an auxiliary filler wire that is fed to the weld, or the addition material may be placed on the work directly.

While certain specific examples and embodiments of the invention has been described above for the purpose of illustrating its nature and operation, it is to be understood that the invention may also be utilized and practiced by those skilled in the art in other ways without departing from its spirit or scope as defined by the following claims.

I claim:

1. A consumable inert gas shielded metal arc welding electrode formed with a bare electrically conductive surface, said electrode consisting essentially of aluminum and having an arc control addition thereto of a compound of cesium.

2. A consumable non-ferrous inert gas shielded metal arc welding electrode comprising essentially a metal selected from the group consisting of aluminum, copper, nickel, and magnesium and formed with a substantially bare electrically conductive surface and having an arc control addition thereto of a compound of cesium.

References Cited in the file of this patent

UNITED STATES PATENTS

| | | |
|---|---|---|
| 1,783,013 | Green | Nov. 25, 1930 |
| 1,817,448 | Ulrey | Aug. 4, 1931 |
| 1,916,206 | Dawson | July 4, 1933 |
| 1,936,349 | Castle | Nov. 21, 1933 |
| 1,976,397 | Holst et al. | Oct. 9, 1934 |
| 2,056,660 | Foulke | Oct. 6, 1936 |
| 2,219,872 | Myers | Oct. 29, 1940 |
| 2,264,717 | Ruedy | Dec. 2, 1941 |
| 2,470,763 | Doyle | May 24, 1949 |
| 2,540,811 | Cobine | Feb. 6, 1951 |
| 2,632,080 | Wasserman | Mar. 17, 1953 |
| 2,694,764 | Muller | Nov. 16, 1954 |